(12) United States Patent
Bichl et al.

(10) Patent No.: US 11,366,198 B2
(45) Date of Patent: Jun. 21, 2022

(54) PROCESSING RADAR SIGNALS

(71) Applicant: Infineon Technologies AG, Neubiberg (DE)

(72) Inventors: Markus Bichl, Feldkirchen-Westerham (DE); Ljudmil Anastasov, Munich (DE); Romain Ygnace, Brunnthal (DE)

(73) Assignee: Infineon Technologies AG, Neubiberg (DE)

( * ) Notice: Subject to any disclaimer, the term of this patent is extended or adjusted under 35 U.S.C. 154(b) by 148 days.

(21) Appl. No.: 16/751,404

(22) Filed: Jan. 24, 2020

(65) Prior Publication Data
US 2020/0256950 A1    Aug. 13, 2020

(30) Foreign Application Priority Data

Feb. 12, 2019  (DE) .......................... 102019103514.7

(51) Int. Cl.
*G01S 13/00* (2006.01)
*G01S 7/35* (2006.01)
*G06F 1/08* (2006.01)

(52) U.S. Cl.
CPC ............... *G01S 7/352* (2013.01); *G06F 1/08* (2013.01)

(58) Field of Classification Search
CPC ........ G01S 7/352; G01S 7/4021; G01S 13/22; G01S 2205/00; G06F 1/08
USPC .......................... 342/160, 162, 195, 196, 204
See application file for complete search history.

(56) References Cited

U.S. PATENT DOCUMENTS

| | | | | |
|---|---|---|---|---|
| 5,448,245 | A * | 9/1995 | Takase | .................... G01S 7/292 342/160 |
| 10,141,657 | B2 * | 11/2018 | Kishigami | .......... G01S 13/4463 |
| 2009/0195440 | A1 | 8/2009 | Saunders | |
| 2017/0307727 | A1 | 10/2017 | Goda | |

FOREIGN PATENT DOCUMENTS

DE  102015116434 A1  3/2017

* cited by examiner

*Primary Examiner* — Hoan H Tran
(74) *Attorney, Agent, or Firm* — Eschweiler & Potashnik, LLC (57) ABSTRACT

A method for processing a radar signal includes adjusting a processing clock signal, wherein the processing clock signal determines an operation period of a signal processing circuit, wherein the processing clock signal is determined based on a time window, wherein the size of the time window is determined based on the maximum time available for processing a portion of the radar signal and wherein the end of the time window is determined such that it does not occur during an active transmission portion of the radar system.

18 Claims, 6 Drawing Sheets

Fig. 6

PROCESSING RADAR SIGNALS

REFERENCE TO RELATED APPLICATION

This Application claims priority to German Application No. 10 2019 103 514.7, filed on Feb. 12, 2019, the contents of which are hereby incorporated by reference in their entirety.

FIELD

The present disclosure relates to radar applications, in particular an efficient way to process radar signals obtained by at least one radar sensor, e.g., via at least one antenna. Processing radar signals in this regard in particular refers to radar signals received by a sensor or an antenna.

BACKGROUND

Several radar variants are used in cars for various applications. For example, radar can be used for blind spot detection (parking assistant, pedestrian protection, cross traffic), collision mitigation, lane change assist and adaptive cruise control. Numerous use case scenarios for radar appliances may be directed to different directions (e.g., back, side, front), varying angles (e.g., azimuth direction angle) and/or different distances (short, medium or long range). For example, an adaptive cruise control may utilize an azimuth direction angle amounting to ±18 degrees, the radar signal is emitted from the front of the car, which allows a detection range up to several hundred meters.

A radar source emits a signal and a sensor detects a returned signal. A frequency shift between the emitted signal and the detected signal (based on, e.g., a moving car emitting the radar signal) can be used to obtain information based on the reflection of the emitted signal. Front-end processing of the signal obtained by the sensor may comprise a Fast Fourier Transform (FFT), which may result in a signal spectrum, i.e. a signal distributed across a range of frequencies. The amplitude of the signal may indicate an amount of echo, wherein a peak may represent a target that needs to be detected and used for further processing, e.g., adjust the speed of the car based on another car traveling in front.

A radar processing device may provide different types of outputs, e.g., a command to a control circuit, an object or an object list to be post-processed by at least one control circuit, and/or at least one FFT peak to be post-processed by at least one control circuit. Utilizing FFT peaks enables high performance post processing.

It is in particular an issue that high speed processing conducted by a signal processing circuit (SPU) may cause power supply current jumps that may disturb the radar units, in particular during a transmission phase via the radar antenna(s).

SUMMARY

At least one problem to be solved, for example, is to overcome the disadvantage stated above and in particular to provide a solution to efficiently process signals in a radar system.

The examples suggested herein may, for example, be based on at least one of the following solutions. For example, combinations of the following features could be utilized in order to reach a desired result. The features of the method could be combined with any feature(s) of the device, apparatus or system or vice versa.

A method for processing a radar signal is disclosed. The method comprises adjusting a processing clock signal, wherein the processing clock signal determines an operation period of a signal processing circuit, wherein the processing clock signal is determined based on a time window. In the method the size of the time window is determined based on the maximum time available for processing a portion of the radar signal, and the end of the time window is determined such that it does not occur during an active transmission portion of the radar system.

The method allows conducting the signal processing at variable speed due to the adjusted processing clock signal. It is thus possible to provide time windows for processing subsequent to each other with no or only little gap between them. Without substantial gaps, there is no disturbing switching on/off between the time windows and therefore little to no disturbance conveyed over power supply lines.

In other words, the signal processing durations are continuously spread and ensure a seamless operation of the radar system by consuming a single DC supply current (instead of current jumps that would otherwise be caused by switching the SPU on and off).

In addition to mitigating the detrimental effect of load jumps, the solution presented herein may be used to efficiently distribute a power that is consumed during an acquisition period. For example, instead of using the SPU running at 100% processing power at 50% of the time, the SPU may be run at 50% processing power during the full time of the acquisition period. This would also avoid reaching high current consumption loads.

According to an embodiment, the start of the time window is determined such that it does not occur during an active transmission portion of the radar system According to an embodiment, the processing clock signal is adjusted based on a clock signal via a fractional clock divider circuit.

The fractional clock divider circuit is also known as a frequency divider circuit, a clock divider circuit, a scaler circuit or a prescaler circuit. It provides an output frequency $f_{out}$ based on an input frequency fin as follows: $f_{out}=f_{in}/n$, wherein n is an integer.

It is an option that this is implemented by a programmable fractional clock divider circuit, which is configured to meet the requirements as defined above. Such configuration may be done one or several times.

The configuration of the fractional clock divider can even be done during operation, i.e. in run time.

According to an embodiment, the portion of the radar signal comprises a transmission portion of the radar signal and/or a receiving portion of the radar signal, each of which, in one embodiment, comprises a ramp of frequencies.

The portion of the radar signal that is subject to the processing may, in one embodiment, be a transmission portion as described herein. The transmission portion may be associated with a radar chip (or any radar unit) that emits and receives radar signals, for example, radar signals of varying frequencies. During the time the radar signals are emitted and/or received by the radar unit, the power supply conveys electrical energy to the radar unit and to the signal processing circuit. If the signal processing circuit is switched on (enabled) or switched off (disabled) during the transmission portion of the radar signal, this will result in a load jump and thus disturb the transmission/reception of the radar signal by the radar unit and thus deteriorates the overall recognition of the radar system.

As suggested, such disturbance can be reduced or avoided if there is no such load jump during the transmission portion or the receiving portion of the radar signal.

According to an embodiment, adjusting the processing clock signal comprises reducing or increasing a cycle rate at which the signal processing circuit is run.

Hence, the speed at which the SPU is run can be adjusted by the fractional clock divider circuit.

According to an embodiment, adjusting the processing clock signal comprises at least one of the following: at the start of the time window, gradually increasing the frequency of the processing clock signal until the frequency of the processing clock signal is reached, and/or at the end of the time window, gradually decreasing the frequency of the processing clock signal until the frequency of the processing clock signal is reached.

Hence, this solution is directed, e.g., to ramping up and/or down the frequency at which the SPU is driven. This is, in one embodiment, useful for the start of the first time window (out of many adjacent time windows) and at the end of the time window (with no adjacent time window of operation for the SPU). Such measure efficiently reduces any voltage overshoot or undershoot towards the power supply and therefore mitigates any potential load jump.

Gradually increasing may be done by ramping up the frequencies towards a processing frequency, which could be the maximum frequency to drive the SPU. It might also be a frequency below the maximum frequency. The ramping up may be realized in discrete steps, which may have same or different lengths/heights. This also applies to ramping down, whereas the ramping up and the ramping down may utilize the same or different ramping patterns.

Also, a radar system is disclosed, and comprises a receiver that is configured to receive a radar signal via an antenna, and a processing circuit. The processing circuit is configured to adjust a processing clock signal. The processing clock signal determines an operation period of the processing circuit, and is determined based on a time window. The size of the time window is determined based on the maximum time available for processing a portion of the radar signal and the end of the time window is determined such that it does not occur during an active transmission portion of the radar system.

According to an embodiment, the processing circuit comprises a signal processing circuit.

Also, a vehicle is suggested comprising at least one radar system as described herein.

Further, a computer program product such as a non-transitory computer readable storage medium is provided, which is directly loadable into a memory of a digital processing device, comprising software code portions for performing the steps of the method as described herein.

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Due to high performance of on-the-fly signal processing radar applications, high current load jumps may occur.

Figure 1:
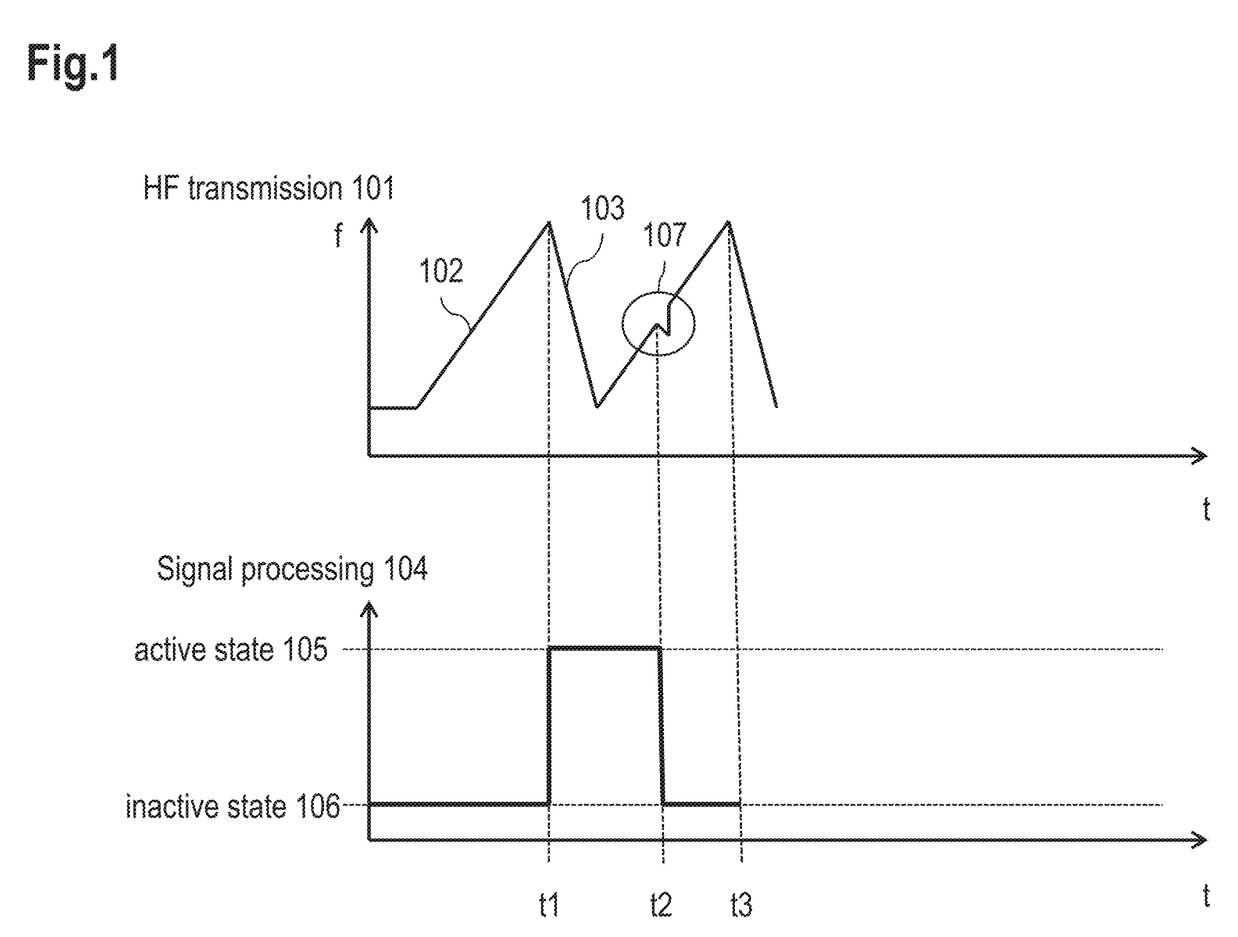
FIG. 1 shows an example diagram comprising a curve of a high-frequency (HF) transmission of a radar system.

FIG. 1 shows an example diagram comprising a curve of a high-frequency (HF) transmission 101 of a radar system. The HF transmission 101 indicates a ramp that comprises an active transmission portion 102 and an idle transmission portion 103. Hence, a radar signal is transmitted during the active transmission portion 102 and a reflected radar signal may be processed during the idle transmission portion 103. Hence, signal processing 104 may start after the active transmission portion 102 is over. The signal processing 104 may be conducted by a signal processing circuit of the radar system; it may comprise an active state 105 and an inactive state 106. At a time t1, the signal processing circuit changes from the inactive state 106 to the active state 105. The signal processing lasts until a time t2, at which the signal processing circuit changes back to the inactive state 106 until a time t3.

In this example, the time t1 corresponds to the moment when the HF transmission 101 changes from the active transmission portion 102 to the idle transmission portion 103. The signal processing circuit 104 is switched to the active state 105 to process data. Such processing ends at the time t2 and the signal processing circuit enters its inactive state 106. However, the change of the signal processing circuit from its active state 105 to its inactive state 106 results in a current jump 107 (also referred to herein as "load jump") that occurs during an active transmission 102 portion of the radar system and cause a noise disturbance which interferes with the low noise requirements of the radar system.

Hence, controlling the size of the load jump and/or its occurrence becomes an important aspect to ensure low noise of a high performance radar operation.

The general demand for high performance radar computing increases an overall power consumption of the modules of the radar system. This leads to higher currents and therefore load jumps have a larger impact when the modules are switched on/off.

Hence, examples described herein in particular suggest controlling the performance of the signal processing duration and/or its speed at a fine granularity.

Figure 2:
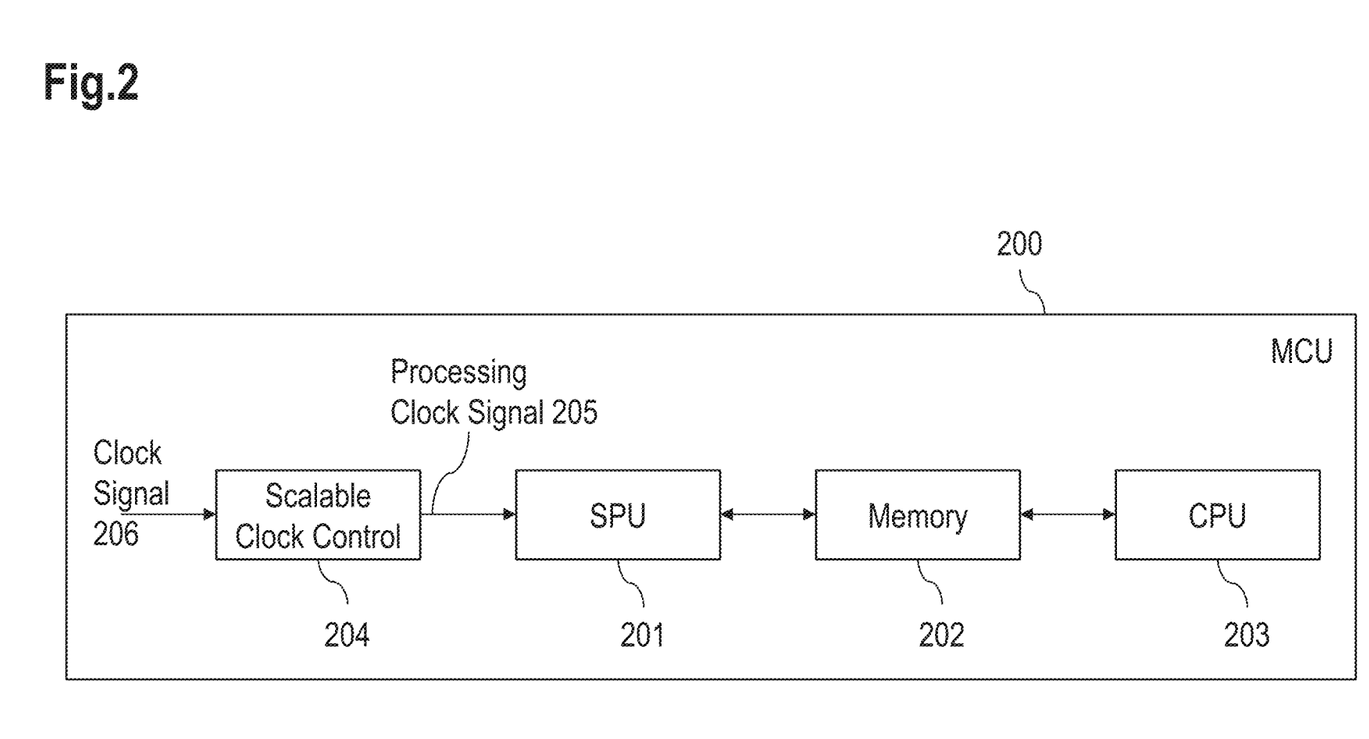
FIG. 2 shows a schematic radar system comprising (among others) circuitry such as a microcontroller (MCU: microcontroller unit or circuit), a signal processing unit or circuit (SPU), a memory, a central processing unit or circuit (CPU) and a scalable clock control unit or circuit.

FIG. 2 shows a schematic radar system comprising (among others) circuitry such as a microcontroller 200 (MCU: microcontroller circuit), a signal processing circuit (SPU) 201, a memory 202, a central processing circuit (CPU) 203 and a scalable clock control circuit 204.

The scalable clock control circuit 204 may be part of the SPU 201 or it may be arranged as a separate circuit. The SPU 201 may obtain a clock signal 206 (also referred to as "module clock" or "clock") or—as an alternative—it may generate such clock signal 206 by itself.

The scalable clock control circuit 204 receives the clock signal 206 and converts it into a processing clock signal 205 (also referred to as "processing clock"). This allows adjusting the clock signal 206 in a flexible manner such that the detrimental effects of load jumps are reduced or even prevented.

The scalable clock control circuit 204 can be realized as or it may comprise a fractional clock divider, which generates the processing clock signal 205 based on the clock signal 206. The processing clock signal 205 may then be used for signal processing purposes.

The scalable clock control circuit 204 allows a fine granular configuration of the processing clock signal 205 and therefore the signal processing duration(s).

Because of the adjusted processing clock signal 205, a processing duration interval of the SPU 201 can be fit within a time window such that the transmission portion 102 is not interrupted, i.e. the processing interval does not end during such transmission portion 102.

Load jumps may therefore not have the detrimental impact on the HF performance as shown in FIG. 1.

Figure 3:
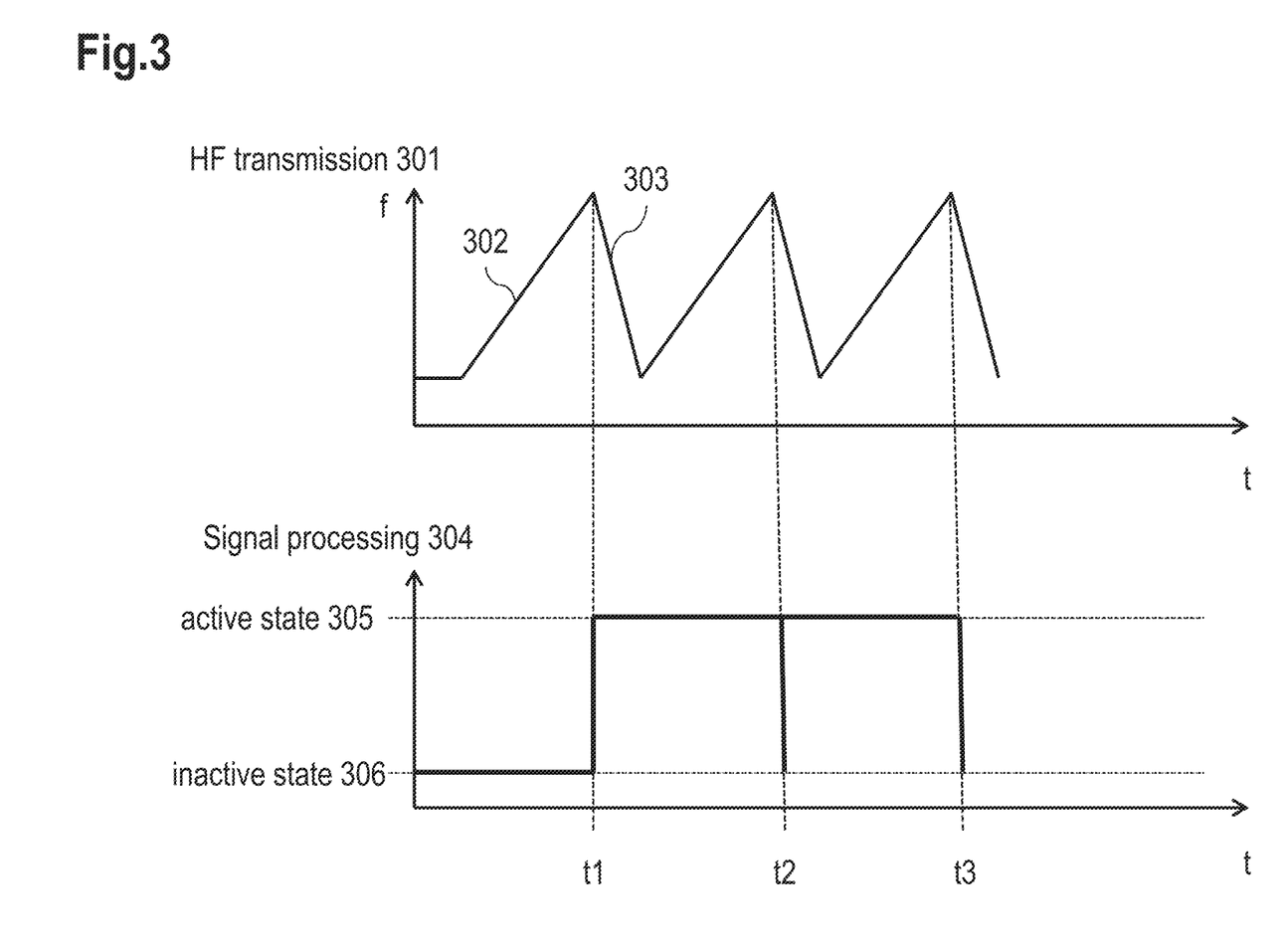
FIG. 3 shows an example diagram comprising a curve of a HF transmission of a radar system with an improved signal processing by the SPU.

FIG. 3 shows an example diagram comprising a curve of a HF transmission 301 of a radar system. The HF transmission 301 indicates a ramp that comprises an active transmission portion 302 and an idle transmission portion 303. Also, FIG. 3 shows a curve 304 of the SPU of the radar system, the curve 304 comprising an active state 305 and an inactive state 306.

At a time t1, the SPU changes from the inactive state 306 to the active state 305 and at a subsequent time t2 it changes back to the inactive state 306.

However, at or nearly at the same time t2 (without significant gap) the signal processing circuit changes from the inactive state 306 back to the active state 305. The same is repeated at a time t3. This results in an optimized scenario without a load jump (compared to the scenario shown in FIG. 1).

Hence, the active transmission portion 302 fits in a time window during which the SPU is in the active state 305 (in the example shown in FIG. 3, the time window is between t1 and t2 and between t2 and t3). This avoids load jumps occurring during the transmission portion 302.

As an option, the time window may in particular be as long as the active transmission portion 302 and the inactive transmission portion 303. The time window in such example only ends/starts at the time the active transmission portion 302 ends and the inactive transmission portion 303 begins.

Utilizing the fractional clock divider circuit of the scalable control circuit 204, any gap between two adjacent active states 305 can be minimized thereby further reducing any load jump.

Assuming that a signal processor runs at a maximum frequency amounting to 300 MHz, a duration of a processing task of the signal processor may amount to 0.4 T. Reducing the frequency to, e.g., 180 MHz may increase the duration of the processing task to T. In this regard, T may be the time, which allows two successive active states 305 to occur without (substantial) time gap. The fractional clock divider circuit that sets the frequency of the signal processor may be arranged to minimize such gap. The duration of the processing task T may correspond to the time interval t2-t1 in FIG. 1.

Figure 4:
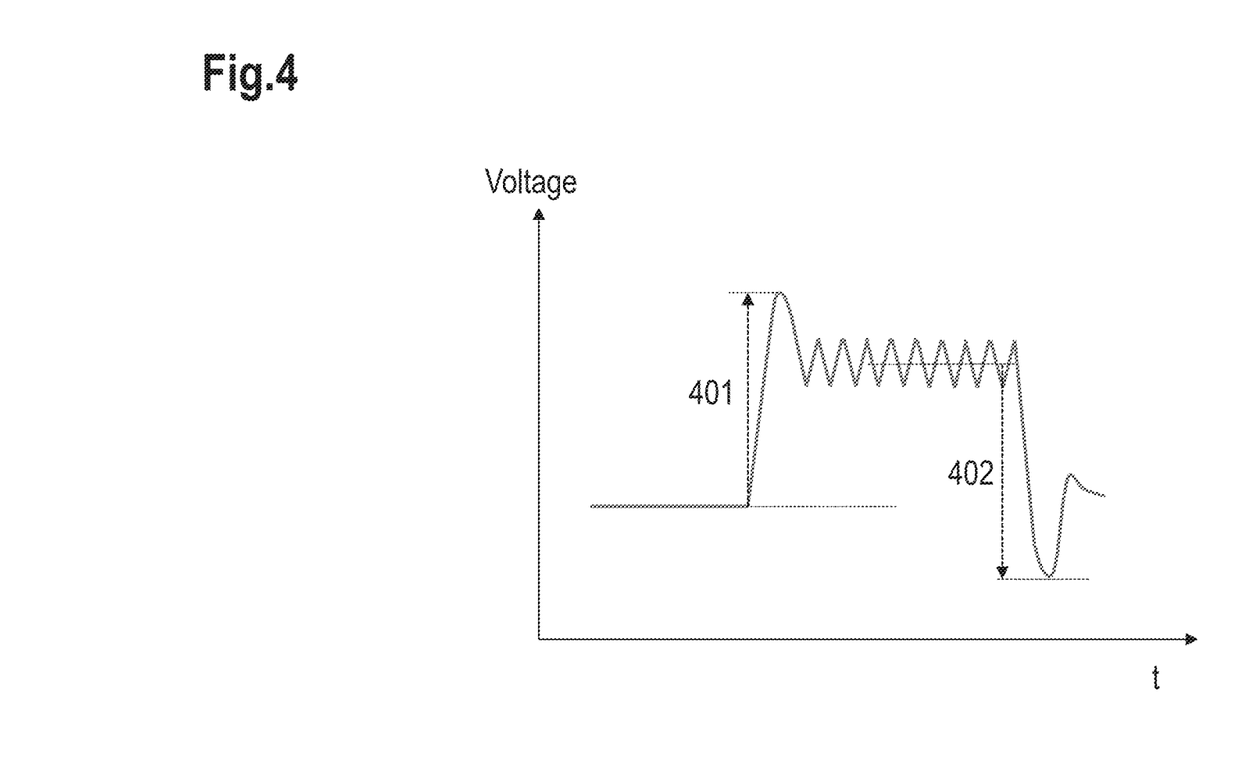
FIG. 4 shows a schematic diagram visualizing a positive voltage load jump and a negative voltage load jump when the SDU is switched on and off.

FIG. 4 shows a schematic diagram visualizing yet another detrimental effect in existing radar solutions: The higher the overall computing performance, the higher the impact of positive voltage load jumps 401 and negative voltage load jumps 402 when such computing is enabled or disabled.

This may be critical in case such voltage overshoots and/or voltage undershoots exceed the range or limits of power supply concepts, which may trigger functional safety alarms, resets or the like and hamper the seamless operation of the radar system.

Hence, the fractional clock divider circuit described above may be configured to supply an up-ramping and/or down-ramping sequence of the processing clock. This allows the module or SPU 201 to gradually reach full speed (or any high speed that falls short of full speed) of processing and to gradually reach a lower speed or a halt state.

This further limits the detrimental effect of load jumps at the beginning and/or the end of processing periods.

Figure 5:
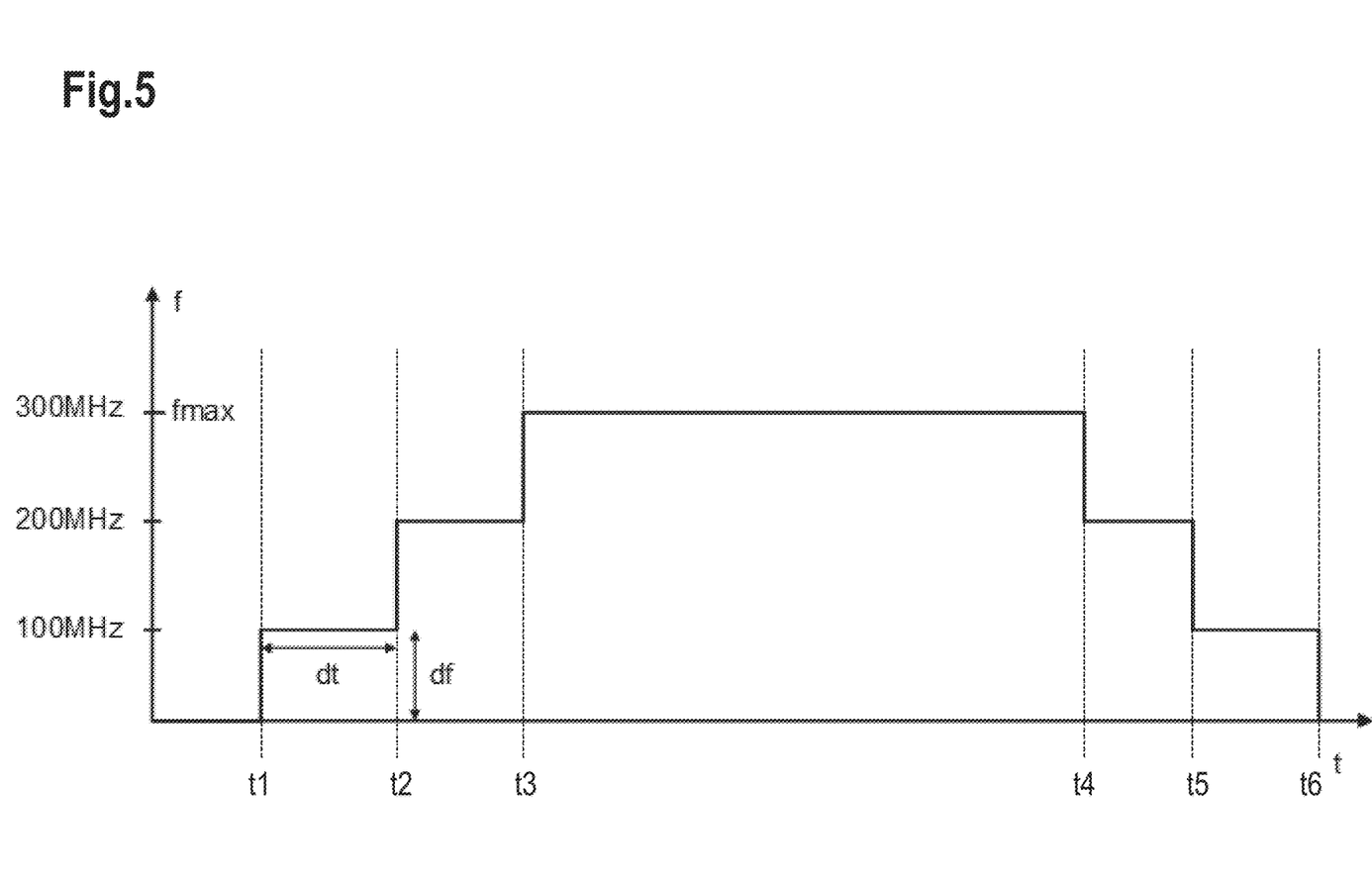
FIG. 5 shows an example diagram where a frequency to operate the module or SPU is gradually ramped up and ramped down.

FIG. 5 shows an example diagram where a frequency to operate the module or SPU 201 from a time $t_1$ to a time $t_3$ is gradually ramped up to a predetermined maximum frequency $f_{max}$. The module or SPU 201 is run at this frequency fmax from the time $t_3$ until a time $t_4$. After the time $t_4$, the frequency is gradually ramped down to zero until a time $t_6$. This, for example, allows for a soft start and a soft end of a processing period.

The ramp shown in FIG. 5 predominately serves the purpose of illustration. The ramp may comprise more or less stages, the ramp may be asymmetrical, i.e. comprising a different number of stages increasing the frequency compared to the number of stages used decreasing the frequency. The ramps may have different sizes or shapes. The timing for each ramp may be the same or it may vary. Also, the ramp may be applied between two operating frequencies, wherein at least one operating frequency does not have to be zero.

Figure 6:
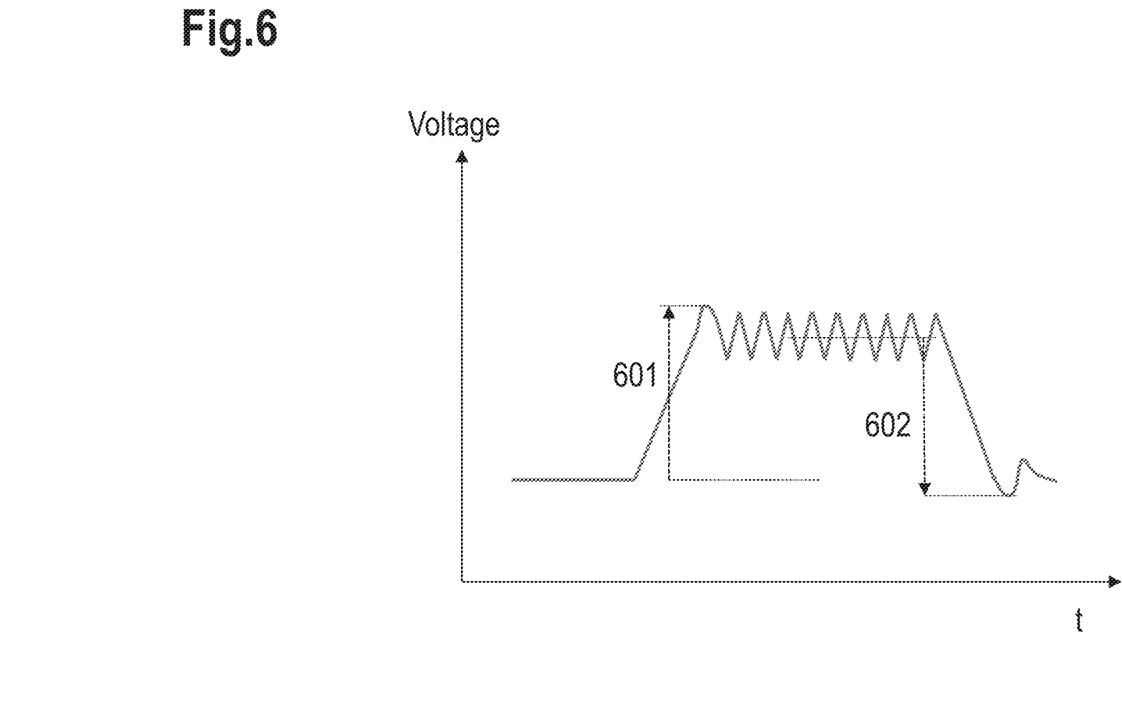
FIG. 6 shows a schematic diagram with a reduced positive voltage load jump and a reduced negative voltage load jump compared to the scenario shown in FIG. 4.

FIG. 6 shows a schematic diagram with a reduced positive voltage load jump 601 and a reduced negative voltage load jump 602 compared to the scenario shown in FIG. 4. Due to the ramping concept shown in FIG. 5, a voltage overshoot as well as a voltage undershoot is significantly reduced, thereby also avoiding impairing the seamless operation of the power-supply concept and thus the radar system.

In one or more examples, the functions described herein may be implemented at least partially in hardware, such as specific hardware circuitry components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing circuit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing circuits (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or circuits are described in this disclosure to emphasize functional aspects of devices configured to perform the disclosed techniques, but do not necessarily require realization by different hardware circuits. Rather, as described above, various circuits may be combined in a single hardware circuit or provided by a collection of interoperative hardware circuits, including one or more processors as described above, in conjunction with suitable software and/or firmware.

Although various example embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for processing a radar signal, comprising:
adjusting a processing clock signal, wherein the processing clock signal determines an operation period of a signal processing circuit, wherein the processing clock signal is determined based on a time window,
wherein a size of the time window is determined based on a maximum time available for processing a portion of the radar signal, and
wherein an end of the time window is determined such that it does not occur during an active transmission portion of a radar system that processes the radar signal.

2. The method according to claim 1, wherein a start of the time window is determined such that it does not occur during an active transmission portion of the radar system.

3. The method according to claim 1, wherein the processing clock signal is adjusted based on a clock signal via a fractional clock divider circuit.

4. The method according to claim 1, wherein a portion of the radar signal comprises a transmission portion of the radar signal, a receiving portion of the radar signal, or both, and wherein one or both of the transmission portion and the receiving portion of the radar signal comprises a ramp of frequencies.

5. The method according to claim 1, wherein adjusting the processing clock signal comprises reducing or increasing a cycle rate at which the signal processing circuit is run.

6. The method according to claim 1, wherein adjusting the processing clock signal comprises at least one of the following:
at the start of the time window, gradually increasing a frequency of the processing clock signal until the frequency of the processing clock signal is reached, and/or
at the end of the time window, gradually decreasing the frequency of the processing clock signal until the frequency of the processing clock signal is reached.

7. A radar system, comprising:
a receiver circuit configured to receive a radar signal via an antenna,
a processing circuit configured to:
adjust a processing clock signal, wherein the processing clock signal determines an operation period of the processing circuit, wherein the processing clock signal is determined based on a time window,
wherein a size of the time window is determined based on a maximum time available for processing a portion of the radar signal, and
wherein an end of the time window is determined such that it does not occur during an active transmission portion of the radar system.

8. The radar system according to claim 7, wherein the processing circuit is or comprises a signal processing circuit.

9. The radar system of claim 7, wherein a start of the time window is determined such that it does not occur during an active transmission portion of the radar system.

10. The radar system of claim 7, wherein the processing clock signal is adjusted by the processing circuit based on a clock signal via a fractional clock divider circuit.

11. The radar system of claim 7, wherein a portion of the radar signal comprises a transmission portion of the radar signal, a receiving portion of the radar signal, or both, and wherein one or both of the transmission portion and the receiving portion of the radar signal comprises a ramp of frequencies.

12. The radar system of claim 7, wherein the processing circuit is configured to adjust the processing clock signal by reducing or increasing a cycle rate at which a signal processing circuit is run.

13. The radar system of claim 7, wherein the processing circuit is configured to adjust the processing clock signal by at least one of the following:
- at the start of the time window, gradually increasing a frequency of the processing clock signal until the frequency of the processing clock signal is reached, and/or
- at the end of the time window, gradually decreasing the frequency of the processing clock signal until the frequency of the processing clock signal is reached.

14. A non-transitory computer readable medium containing instructions that are loadable into a memory of a digital processing device of a radar system, that upon execution by the digital processing device is operable to perform a method, comprising:
- adjusting a processing clock signal, wherein the processing clock signal determines an operation period of a signal processing circuit, wherein the processing clock signal is determined based on a time window,
- wherein a size of the time window is determined based on a maximum time available for processing a portion of a radar signal, and
- wherein an end of the time window is determined such that it does not occur during an active transmission portion of the radar system.

15. The non-transitory computer readable medium of claim 14, further comprising instructions that when executed dictate that a start of the time window is determined such that it does not occur during an active transmission portion of the radar system.

16. The non-transitory computer readable medium of claim 14, further comprising instructions that when executed dictate that the processing clock signal is adjusted based on a clock signal via a fractional clock divider circuit.

17. The non-transitory computer readable medium of claim 14, further comprising instructions that when executed dictate that adjusting the processing clock signal comprises reducing or increasing a cycle rate at which the signal processing circuit is run.

18. The non-transitory computer readable medium of claim 14, further comprising instructions that when executed dictate that adjusting the processing clock signal comprises at least one of the following:
- at the start of the time window, gradually increasing a frequency of the processing clock signal until the frequency of the processing clock signal is reached, and/or
- at the end of the time window, gradually decreasing the frequency of the processing clock signal until the frequency of the processing clock signal is reached.

* * * * *